United States Patent
Lin et al.

(10) Patent No.: US 11,869,168 B2
(45) Date of Patent: Jan. 9, 2024

(54) METHOD FOR OPTIMIZING DISPLAY IMAGE BASED ON DISPLAY CONTENT, RELATED DISPLAY CONTROL CHIP AND RELATED NON-TRANSITORY COMPUTER-READABLE MEDIUM

(71) Applicant: Realtek Semiconductor Corporation, Hsinchu (TW)

(72) Inventors: Yuh-Wey Lin, Hsinchu (TW); Jui-Te Wei, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 117 days.

(21) Appl. No.: 17/650,858

(22) Filed: Feb. 14, 2022

(65) Prior Publication Data
US 2023/0009627 A1    Jan. 12, 2023

(30) Foreign Application Priority Data
Jul. 7, 2021   (TW) .................................. 110124986

(51) Int. Cl.
*G06T 3/40* (2006.01)
*G06V 10/75* (2022.01)

(52) U.S. Cl.
CPC .............. *G06T 3/40* (2013.01); *G06V 10/758* (2022.01); *G06T 2207/10016* (2013.01)

(58) Field of Classification Search
CPC .. G06V 10/757; G06V 10/758; G06V 10/759; G06V 10/75; G06V 10/752; G06V 10/754; G06T 3/40
See application file for complete search history.

(56) References Cited

U.S. PATENT DOCUMENTS

| | | | |
|---|---|---|---|
| 8,515,153 B2* | 8/2013 | Sugiyama | G06T 7/001 382/288 |
| 2003/0144592 A1* | 7/2003 | Jeong | A61B 5/4872 600/442 |
| 2023/0009627 A1* | 1/2023 | Lin | G09G 3/2096 |

\* cited by examiner

*Primary Examiner* — Todd Buttram
(74) *Attorney, Agent, or Firm* — CKC & Partners Co., LLC (57) ABSTRACT

A method for optimizing a display image based on display content is provided. The method is applicable to a display control chip, and includes following operations: receiving a video signal configured to transmit an image of a frame; with respect to multiple different sub-areas in an area of the image, calculating a pixel number distribution of each sub-area along multiple characteristic values; determining, according to the pixel number distribution, whether the sub-area comprises a corresponding first target pattern of multiple first target patterns; if the multiple sub-areas comprise the multiple first target patterns, respectively, performing a first preset image processing to the image to generate a processed image; if the multiple sub-areas are free from comprising the multiple first target patterns, respectively, omitting the first preset image processing to the image; and generating a display signal according to the processed image or the image.

20 Claims, 5 Drawing Sheets

| 310  | 320 | 330 |
|------|-----|-----|
| 1.5% | 3%  | 1%  |
| 340  | 350 | 360 |
| 2.5% | 2%  | 3%  |
| 370  | 380 | 390 |
| 16%  | 15% | 12% |

Fig. 5

METHOD FOR OPTIMIZING DISPLAY IMAGE BASED ON DISPLAY CONTENT, RELATED DISPLAY CONTROL CHIP AND RELATED NON-TRANSITORY COMPUTER-READABLE MEDIUM

RELATED APPLICATIONS

This application claims priority to Taiwan Application Serial Number 110124986, filed on Jul. 7, 2021, which is herein incorporated by reference in its entirety.

BACKGROUND

Technical Field

The present disclosure relates to a method for optimizing a display image and to a display control chip and a non-transitory computer readable storage media related thereto. More particularly, the present disclosure relates to a method for optimizing a display image according to display content and to a display control chip and a non-transitory computer readable storage media related thereto.

Description of Related Art

Displays on the market allow users to manually select different display modes for different situations through push buttons. For example, the user can adjust the display to a high chromaticity mode when playing a computer game. As another example, when watching a movie, the user can set the display to a high-contrast mode. However, manipulating the display through push buttons is an ineffective and time-consuming operation. If the display can recognize the current use situation through the display content and automatically adjust the display mode according to the use situation, the user experience will be greatly improved.

SUMMARY

The disclosure provides a method for optimizing a display image based on display content. The method is applicable to a display control chip, and includes the following operations: receiving a video signal configured to transmit an image of a frame; with respect to a plurality of sub-areas different to each other in an area of the image, calculating a pixel number distribution of each sub-area along a plurality of characteristic values; determining, according to the pixel number distribution, whether the sub-area comprises a corresponding first target pattern of a plurality of first target patterns; if the plurality of sub-areas comprise the plurality of first target patterns, respectively, performing a first preset image processing to the image to generate a processed image; if the plurality of sub-areas are free from comprising the plurality of first target patterns, respectively, omitting the first preset image processing to the image; and generating a display signal according to the processed image or the image.

The disclosure provides a display control chip including a computing circuit. The computing circuit is configured to: receive a video signal configured to transmit an image of a frame; with respect to a plurality of sub-areas different to each other in an area of the image, calculate a pixel number distribution of each sub-area along a plurality of characteristic values; determine, according to the pixel number distribution, whether the sub-area comprises a corresponding first target pattern of a plurality of first target patterns; if the plurality of sub-areas comprise the plurality of first target patterns, respectively, perform a first preset image processing to the image to generate a processed image; if the plurality of sub-areas are free from comprising the plurality of first target patterns, respectively, omit the first preset image processing to the image; and generate a display signal according to the processed image or the image.

The disclosure provides a non-transitory computer readable storage media storing a computer program. The computer program is for controlling a display control chip including a computing circuit. The computer program, when being executed by the computing circuit, causes the computing circuit to perform: receiving a video signal configured to transmit an image of a frame; with respect to a plurality of sub-areas different to each other in an area of the image, calculating a pixel number distribution of each sub-area along a plurality of characteristic values; determining, according to the pixel number distribution, whether the sub-area comprises a corresponding first target pattern of a plurality of first target patterns; if the plurality of sub-areas comprise the plurality of first target patterns, respectively, performing a first preset image processing to the image to generate a processed image; if the plurality of sub-areas are free from comprising the plurality of first target patterns, respectively, omitting the first preset image processing to the image; and generating a display signal according to the processed image or the image.

One of the advantages of the above embodiments is that the overall circuit area is reduced.

Another advantage of the above embodiments is that the display lag is reduced.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
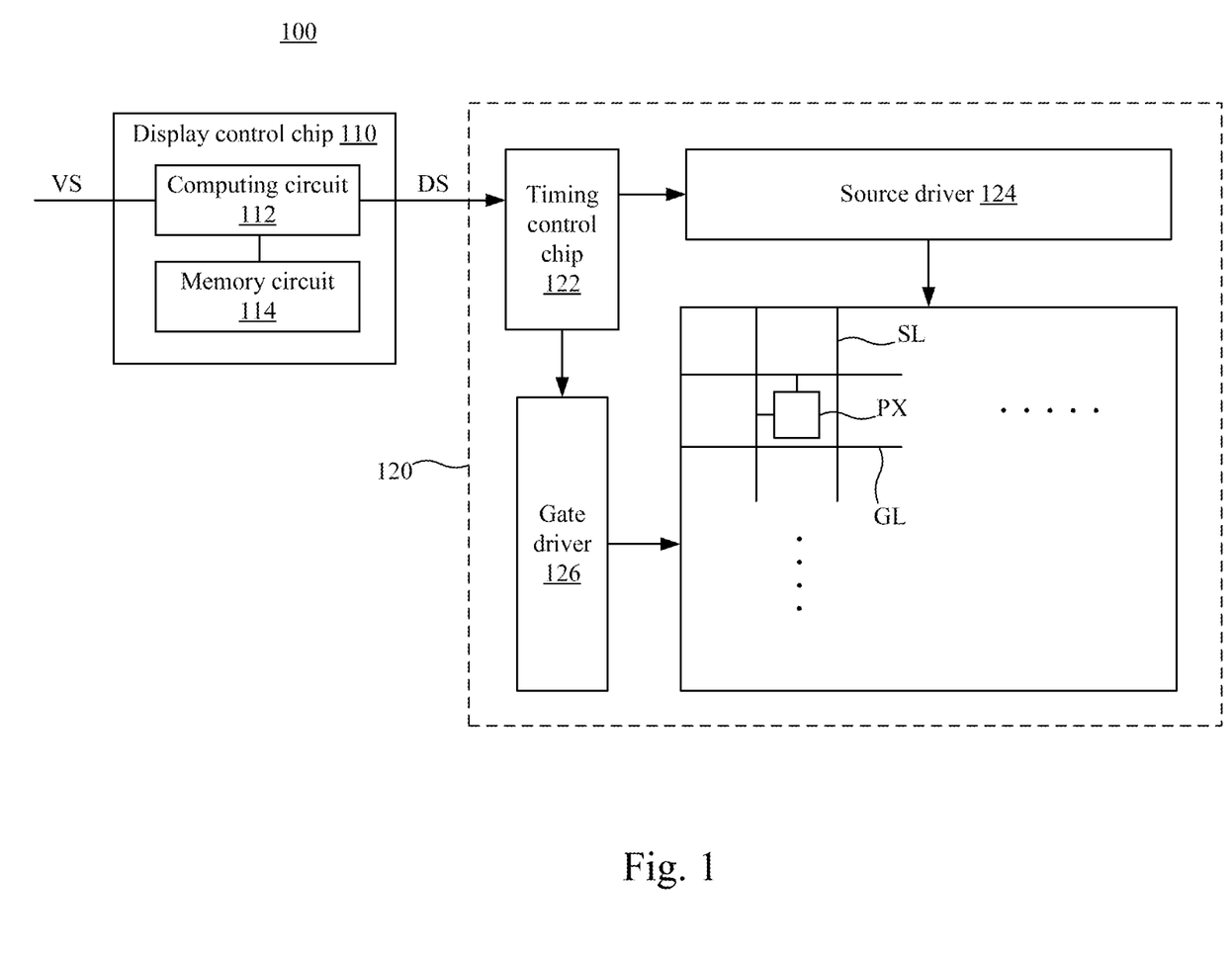
FIG. 1 is a simplified functional block diagram of a display according to an embodiment of the present disclosure.

FIG. 1 is a simplified functional block diagram of a display 100 according to an embodiment of the present disclosure. The display 100 comprises a display control chip 110 and a display panel 120. The display control chip 110 may be coupled with the display panel 120, and configured to receive a video signal VS. In some embodiments, the video signal VS is a decoded D-SUB signal, a decoded digital visual interface (DVI) signal or a decoded high definition multimedia interface (HDMI) signal. The display control chip 110 comprises a computing circuit 112 and a memory circuit 114. The computing circuit 112 is configured to execute a computer program in the memory circuit 114 to optimize image information carried by the video signal VS, and configured to transmit the optimized image information to the display panel 120 through a display signal DS compatible with the display panel 120. In an embodiment, the display signal DS is a low-voltage differential signaling (LVDS) signal.

In some embodiments, the display control chip 110 is a scaler integrated circuit (IC). In other embodiments, the memory circuit 114 is a read-only memory (e.g., the electrically-erasable programmable read-only (EEPROM) memory).

The display panel 120 comprises a timing control chip 122, a source driver 124, a gate driver 126, a plurality of data lines SL, a plurality of gate lines GL and a plurality of pixel circuits PX. The timing control chip 122 is configured to transmit the image information carried by the display signal DS to the source driver 124 in some time periods. The timing control chip 122 is also configured to provide operating clock signals to the source driver 124 and the gate driver 126 so that the source driver 124 and the gate driver 126 may enable the data lines SL and the gate lines GL, respectively, in some time periods. As a result, the pixel circuits PX are driven by the data lines SL and the gate lines GL to form a display image.

Figure 2:
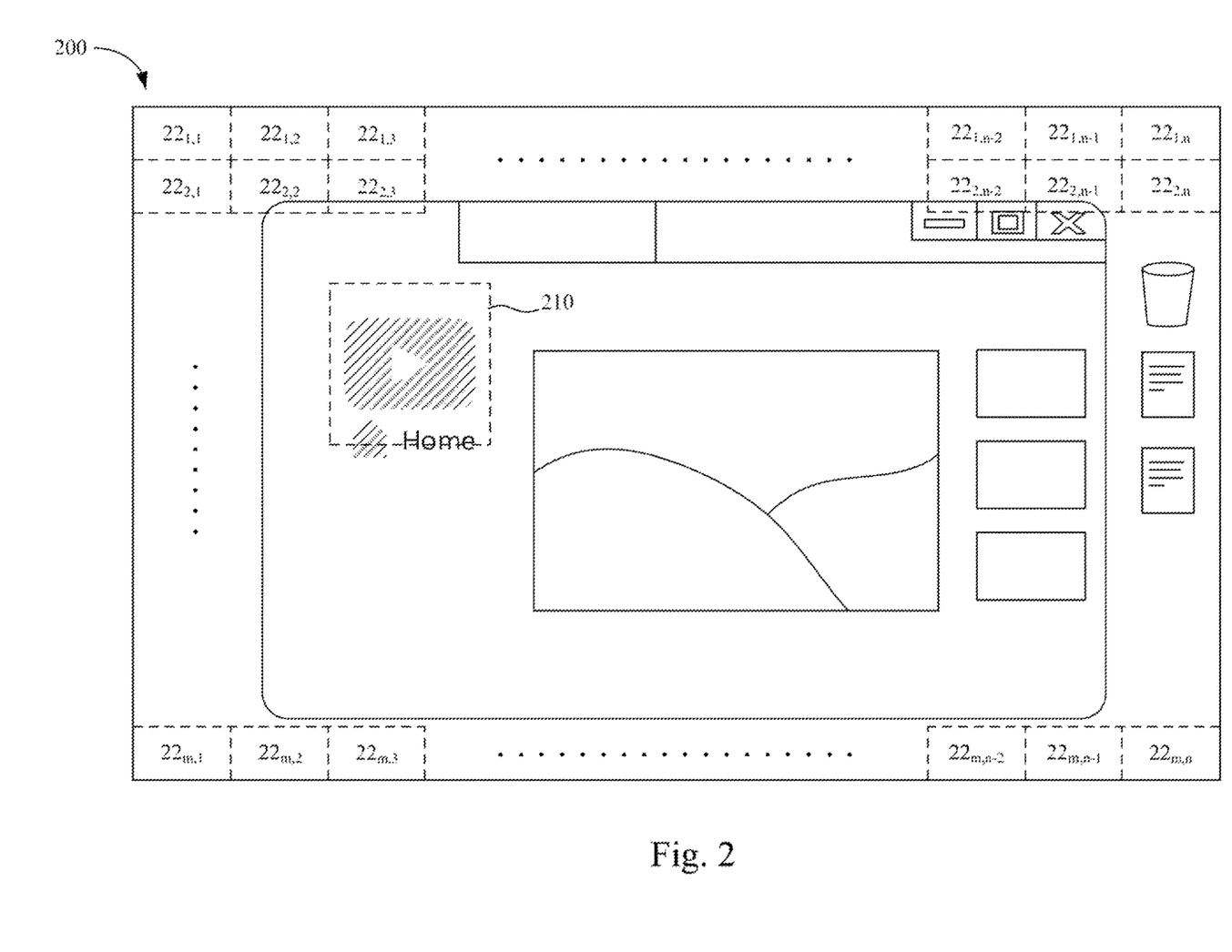
FIG. 2 is a schematic diagram of an image of a frame transmitted by the video signal.
Figure 3:
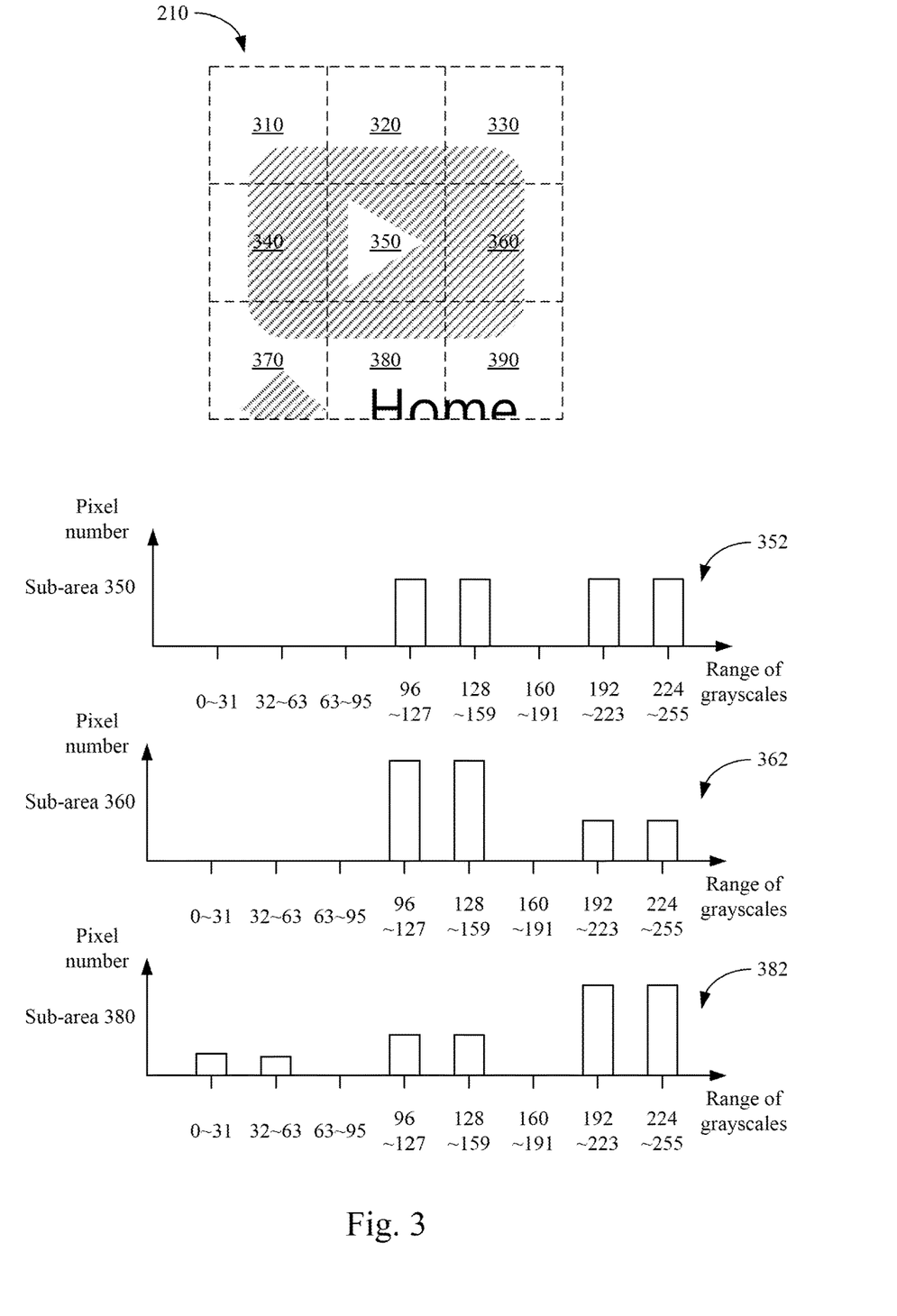
FIG. 3 is a schematic diagram for illustrating the operation of analyzing pixel data in an area of FIG. 1 performed by a computing circuit.

Operations performed by the computing circuit 112 when executing the computer program in the memory circuit 114 are illustrated below with reference to FIG. 2 through FIG. 4. FIG. 2 is a schematic diagram of an image 200 of a frame transmitted by the video signal VS. The image 200 is formed by a plurality of pixel data 22 sequentially transmitted by the video signal VS. For example, the computing circuit 112 may sequentially receive pixel data $22_{1,1}$-$22_{1,n}$ from the video signal VS, then sequentially receive pixel data $22_{2,1}$-$22_{2,n}$ and so forth, in which this operation proceeds until the pixel data $22_{m,n}$ is received indicating that the image 200 is completely received. In the present disclosure, pixel data 22 refers to an unspecific pixel data of any of the pixel data $22_{1,1}$-$22_{m,n}$. The pixel data 22 is configured to specify a grayscale of a corresponding pixel circuit PX. Therefore, if a resolution of the image 200 is 1920×1080, m may be 1080 and n may be 1920.

When receiving the pixel data $22_{1,1}$-$22_{m,n}$ in sequence, the computing circuit 112 may determine whether a pixel data 22 belongs to an area 210 of the image 200. The sizes of the pixel data 22 and the area 210 are merely examples, and this disclosure is not limited thereto. The area 210 corresponds to a plurality of pixel data 22. For example, the area 210 may have a resolution of 480×360. In some embodiments, the area 210 is located in a preset position of the image 200. By counting the received pixel data 22, the computing circuit 112 may determine a position of a current received pixel data 22 in the image 200, so as to further determine whether the current received pixel data 22 belongs to the area 210. The computing circuit 112 may analyze characteristic values of the pixel data 22 in the area 210 to determine whether the area 210 comprises a plurality of target patterns. If so, the computing circuit 112 may perform a preset image processing to the image 200, which is described in detail in the following paragraphs.

In some embodiments that the computing circuit 112 has a greater computing capability, instead of analyzing only the area 210, the computing circuit 112 may analyze a plurality of areas in the image 200 to determine whether one of these areas comprises the aforesaid target patterns.

The operation performed by the computing circuit 112 of analyzing the pixel data 22 in the area 210, which is to determine whether to perform an image processing to the image 200, is described in detail with reference to FIG. 3. FIG. 3 is a schematic diagram for illustrating the operation of analyzing the pixel data 22 in the area 210 performed by the computing circuit 112. The area 210 comprises a plurality of sub-areas 310-390, in which each of the sub-areas 310-390 corresponds to multiple pixel data 22. For example, a resolution of each of the sub-areas 310-390 may be 180×160. The shape and number of the sub-areas 310-390 in FIG. 3 are merely examples, and this disclosure is not limited thereto. In some embodiments, the computing circuit 112 may divide the area 210 into more than 9 sub-areas in order to improve the accuracy of analyzation, or the computing circuit 112 may divide the area 210 into less than 9 sub-areas to reduce the computational complexity. In other embodiments, the sub-areas 310-390 may be configured as a plurality of concentric circles or a plurality of concentric polygons.

The computing circuit 112 may analyze each of the sub-areas 310-390, so as to calculate the number of the pixel data 22 of each of the sub-areas 310-390 distributed along the characteristic values (hereinafter referred to as the "pixel number distribution"). By counting the received pixel data 22, the computing circuit 112 may determine the currently received pixel data 22 belongs to which one of the sub-areas 310-390.

In this embodiment, the computing circuit 112 may calculate the pixel number distribution for each of the sub-areas 310-390 accordingly, which is described in detail with reference to the sub-areas 350, 360 and 380. As shown in FIG. 3, the computing circuit 112 may sequentially receive multiple pixel data 22 of the sub-area 350 from the video signal VS. When receiving each pixel data 22 of the sub-area 350, the computing circuit 112 may determine which one of the characteristic values corresponds to the pixel data 22. In some embodiments, the characteristic values are grayscale ranges different from each other. The grayscale ranges may be, for example, eight ranges of 0-31 grayscales, 32-63 grayscales, 64-95 grayscales, 96-127 grayscales, 128-159 grayscales, 160-191 grayscales, 192-223 grayscales and 224-255 grayscales.

Therefore, with respect to each pixel data 22 of the sub-area 350, the computing circuit 112 may determine a grayscale range corresponding to such pixel data 22, and then increase a pixel number corresponding to such grayscale range to form a pixel number distribution 352. For example, if the computing circuit 112 determines that a pixel data 22 of the sub-area 350 corresponds to the range of 128-159 grayscales, the computing circuit 112 may increase the pixel number corresponding to 128-159 grayscales in the pixel number distribution 352 by one. As can be appreciated from FIG. 3, the computing circuit 112 may conclude that a pattern of the sub-area 350 corresponds to the mid-grayscale pixel data 22 and the high-grayscale pixel data 22 having approximately the same number, as shown in the pixel number distribution 352; a pattern of the sub-area 360 corresponds to the mid-grayscale pixel data 22 having a higher number and the high-grayscale pixel data 22 having a lower number, as shown in the pixel number distribution 362; a pattern of the sub-area 380 corresponds to the mid-grayscale pixel data 22 having a lower number, the high-grayscale pixel data 22 having a higher number and the low-grayscale pixel data 22 having the least number, as shown in the pixel number distribution 382, and so forth.

Accordingly, when analyzing the sub-areas 310-390, the computing circuit 112 is free from storing a complete image of the sub-areas 310-390 in the memory circuit 114, in which only the number of the pixel data 22 of each of the sub-areas 310-390 distributed along the characteristic values is stored instead. The computing circuit 112 may use the pixel number distributions of the sub-areas 310-390 to determine whether the sub-areas 310-390 comprise a plurality of target images, so as to determine whether to perform an image processing to the image 200.

In some embodiments, the characteristic values may be a plurality of different colors, such as three different colors of red, blue and green.

Figure 4:
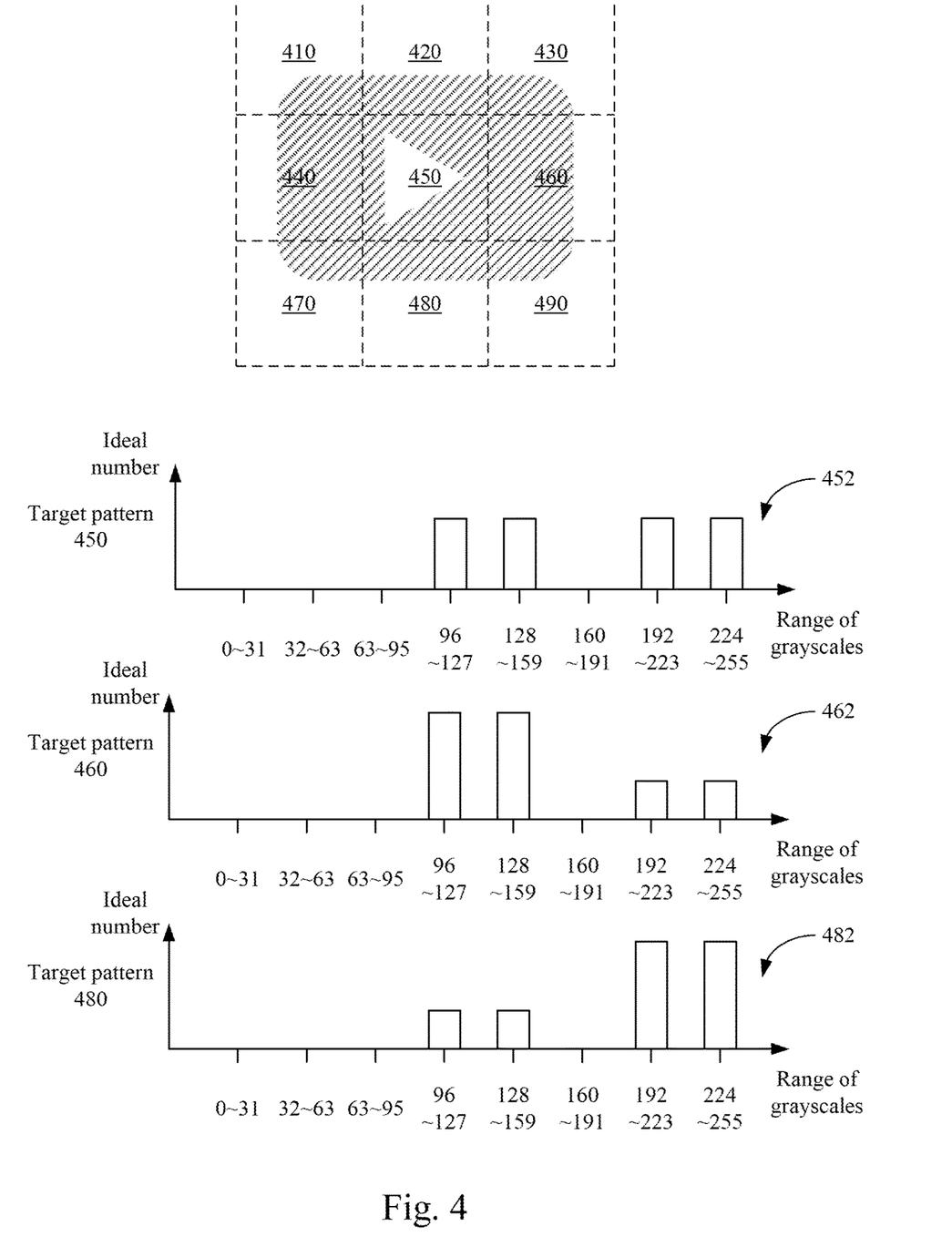
FIG. 4 is a schematic diagram of a plurality of target patterns.

FIG. 4 is a schematic diagram of a plurality of target patterns 410-490. The target patterns 410-490 each have a plurality of pixels, and a number of the target patterns 410-490 is the same as the number of the sub-areas 310-390. Notably, the memory circuit 114 is free from storing a complete image composed of the target patterns 410-490. The memory circuit 114 stores numbers of pixel data 22 ideally distributed along the characteristic values (hereinafter referred to as "ideal number distributions"), which is obtained by assuming that the target patterns 410-490 are transmitted through the pixel data 22. Each of the target patterns 410-490 corresponds to one of the ideal number distributions, which is described in detail below with reference to the target patterns 450, 460 and 480.

As shown in FIG. 4, the target pattern 450 is formed by mid-grayscale pixels and high-grayscale pixels having approximately the same number. Therefore, if the target pattern 450 is transmitted through multiple pixel data 22, ideally, half of these pixel data 22 will distribute in the range of mid-grayscale and another half will distribute in the range of high-grayscale, so that the memory circuit 114 stores an ideal number distribution 452 of FIG. 4 accordingly. Similarly, if the target pattern 460 is transmitted through multiple pixel data 22, most of these pixel data 22 will distribute in the range of mid-grayscale, and other few will distribute in the range of high-grayscale, so that the memory circuit 114 stores an ideal number distribution 462 accordingly. If the target pattern 480 is transmitted through the pixel data 22, most of these pixel data 22 will distribute in the range of high-grayscale, and other few will distribute in the range of mid-grayscale, so that the memory circuit 114 stores an ideal number distribution 482 accordingly. In sum, with respect to each of the target patterns 410-490, the memory circuit 114 stores the number of pixel data 22 ideally distributed along the characteristic values.

An operation performed by the computing circuit 112 to determine whether to perform an image processing to the image 200 will be described in detail with reference to FIG. 3 through FIG. 5. The computing circuit 112 may compare the pixel number distributions of the sub-areas 310-390 with the ideal number distributions of the target patterns 410-490, respectively, to calculate a deviation value of each of the sub-areas 310-390.

Take the sub-area 350 as an example, the computing circuit 112 may calculate, in the range of 0-31 grayscales, a difference between a pixel number of the pixel number distribution 352 and an ideal number of the ideal number distribution 452. Then, the computing circuit 112 may calculate, in the range of 32-63 grayscales, a difference between the pixel number distribution 352 and the ideal number distribution 452, and so forth, until differences of all ranges of grayscales between the pixel number distribution 352 and the ideal number distribution 452 are calculated. The computing circuit 112 may further get an average of those differences to obtain the deviation value of the sub-area 350. The deviation values of the sub-areas 310-390 may be calculated by means similar to those described above, and thus are omitted herein.

Figure 5:
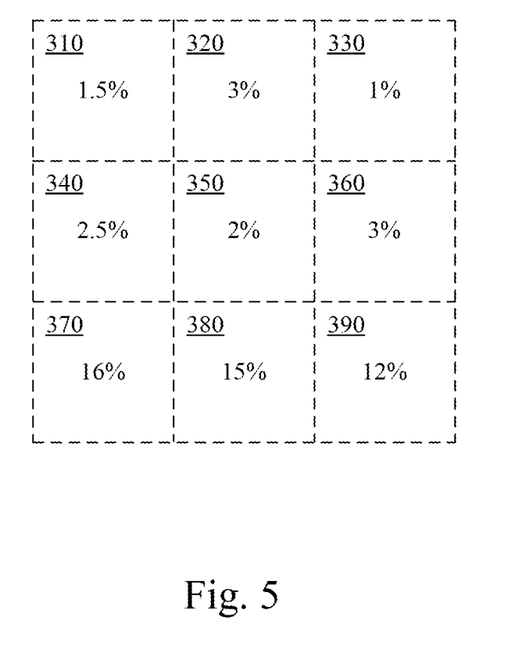
FIG. 5 shows a calculation result of deviation values of sub-areas.

FIG. 5 shows a calculation result of the deviation values of the sub-areas 310-390. The computing circuit 112 may compare each of the deviations values of the sub-areas 310-390 with a threshold value stored in the memory circuit 114 in advance. As can be appreciated from FIG. 3 and FIG. 5, the sub-areas located on the edges of the area 210 are susceptible to interferences, and therefore may have greater deviation values (e.g., the sub-areas 370 and 380). On the other hand, the sub-areas located in the center of the area 210 may have smaller deviation values (e.g., the sub-areas 350). Therefore, the computing circuit 112 may select different threshold values for different sub-areas.

In some embodiment, sub-areas near the center of the area 210 correspond to smaller threshold values, and sub-areas away from the center of the area 210 correspond to greater threshold values. That is, a threshold value of a sub-area may be positively correlated with a distance between such sub-area and the center of the area 210. For example, the threshold value of the sub-area 350 may be 5%, and the threshold values of the sub-areas 310-340 and 360-390 may be 20%. The said distance may be a linear distance separating a center of a sub-area from the center of the area 210, but this disclosure is not limited thereto.

If a deviation value of a sub-area is smaller than a threshold value, the computing circuit 112 may determine that such sub-area comprises a corresponding target pattern. When the deviation values of the sub-areas 310-390 are smaller than their corresponding threshold values, respectively, (as shown in FIG. 5), the computing circuit 112 determines that the sub-areas 310-390 comprise the target patterns 410-490, respectively, and the computing circuit 112 may perform the preset image processing to the image 200. On the contrary, if the deviation values of the sub-areas 310-390 are not smaller than their corresponding threshold values, respectively, the computing circuit 112 determines that the sub-areas 310-390 are free from comprising the target patterns 410-490, and the computing circuit 112 would not perform the preset image processing to the image 200.

In some embodiments, the preset image processing may be brightness manipulation, contrast manipulation or chromaticity manipulation performed to the image 200.

The computing circuit 112 may decide details of the preset image processing according to a pattern recognized from the area 210. For example, when the computing circuit 112 determined that the area 210 comprises the target patterns 410-490, the computing circuit 112 may perform the brightness manipulation to the image 200. As another example, when the computing circuit 112 determines that the area 210 comprises other target patterns different from the target patterns 410-490, the computing circuit 112 may perform the contrast manipulation to the image 200.

After the operations of the above embodiments are finished, the computing circuit 112 may transmit the image 200 processed by or not processed by the image processing to the display panel 120 through the display signal DS. In some embodiments, before transmitting the image 200 processed by or not processed by the image processing to the display panel 120, the computing circuit 112 may adjust the resolution of the image 200 to a resolution corresponding to the display panel 120.

As can be appreciated from the above, the display control chip 110 can adaptively optimized the image transmitted by the video signal VS to improve the user's viewing experience. In addition, the display control chip 110 needs not to store the received images frame by frame, and needs not to store a complete target pattern in advance. The display control chip 110 needs only a few parameters stored in advanced to conduct the operations of image recognition and image comparison. Therefore, the display control chip 110 helps to reduce display lag, and helps to save the amount of memory circuits to reduce the overall circuit area.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method for optimizing a display image based on display content, applicable to a display control chip, the method comprising:
   receiving a video signal configured to transmit an image of a frame;
   with respect to a plurality of sub-areas different to each other in an area of the image, calculating a pixel number distribution of each sub-area along a plurality of characteristic values;
   determining, according to the pixel number distribution, whether the sub-area comprises a corresponding first target pattern of a plurality of first target patterns;
   if the plurality of sub-areas comprise the plurality of first target patterns, respectively, performing a first preset image processing to the image to generate a processed image;
   if the plurality of sub-areas are free from comprising the plurality of first target patterns, respectively, omitting the first preset image processing to the image; and
   generating a display signal according to the processed image or the image.

2. The method of claim 1, wherein determining, according to the pixel number distribution, whether the sub-area comprises the corresponding first target pattern of the plurality of first target patterns comprises:
   comparing the pixel number distribution with an ideal number distribution corresponding to the sub-area to generate a deviation value; and
   if the deviation value is smaller than a threshold value corresponding to the sub-area, determining that the sub-area comprises the corresponding first target pattern.

3. The method of claim 2, wherein the threshold value corresponding to the sub-area is positively correlated with a distance between the sub-area and a center of the area.

4. The method of claim 1, wherein the display control chip is configured to output the display signal to a display panel, and generating the display signal according to the processed image or the image comprises: adjusting a resolution of the processed image or the image to a resolution corresponding to the display panel.

5. The method of claim 1, wherein calculating the pixel number distribution of each sub-area along the plurality of characteristic values comprises:
   sequentially receiving a plurality of pixel data of the sub-area from the video signal;
   when receiving each pixel data, determining a corresponding characteristic value of the plurality of characteristic values to be corresponding to the pixel data; and
   increasing a pixel number of the corresponding characteristic value to form the pixel number distribution.

6. The method of claim 1, further comprising:
   determining, according to the pixel number distribution, whether the sub-area comprises a corresponding second target pattern of a plurality of second target patterns, wherein the plurality of first target patterns are different from the plurality of second target patterns;
   if the plurality of sub-areas comprise the plurality of second target patterns, respectively, performing a second preset image processing to the image to generate the processed image, wherein the first preset image processing is different from the second preset image processing; and
   if the plurality of sub-areas are free from comprising the plurality of second target patterns, respectively, omitting the second preset image processing to the image.

7. The method of claim 1, wherein the area is located in a preset position of the image.

8. A display control chip, comprising a computing circuit configured to:
   receive a video signal configured to transmit an image of a frame;
   with respect to a plurality of sub-areas different to each other in an area of the image, calculate a pixel number distribution of each sub-area along a plurality of characteristic values;
   determine, according to the pixel number distribution, whether the sub-area comprises a corresponding first target pattern of a plurality of first target patterns;
   if the plurality of sub-areas comprise the plurality of first target patterns, respectively, perform a first preset image processing to the image to generate a processed image;
   if the plurality of sub-areas are free from comprising the plurality of first target patterns, respectively, omit the first preset image processing to the image; and
   generate a display signal according to the processed image or the image.

9. The display control chip of claim 8, wherein when the computing circuit determines, according to the pixel number distribution, whether the sub-area comprises the corresponding first target pattern of the plurality of first target patterns, the computing circuit compares the pixel number distribution with an ideal number distribution corresponding to the sub-area to generate a deviation value,
    wherein if the deviation value is smaller than a threshold value corresponding to the sub-area, the computing circuit determines that the sub-area comprises the corresponding first target pattern.

10. The display control chip of claim 9, wherein the threshold value corresponding to the sub-area is positively correlated with a distance between the sub-area and a center of the area.

11. The display control chip of claim 8, wherein the display control chip is configured to transmit the display signal to a display panel, when the computing circuit generates the display signal according to the processed image or the image, the computing circuit adjusts a resolution of the processed image or the image to a resolution corresponding to the display panel.

12. The display control chip of claim 8, wherein when the computing circuit calculates the pixel number distribution of each sub-area along the plurality of characteristic values, the computing circuit sequentially receives a plurality of pixel data of the sub-area from the video signal,
    wherein when the computing circuit receives each pixel data, the computing circuit determines a corresponding characteristic value of the plurality of characteristic values to be corresponding to the pixel data, and increases a pixel number of the corresponding characteristic value to form the pixel number distribution.

13. The display control chip of claim 8, wherein the computing circuit is further configured to:
    determine, according to the pixel number distribution, whether the sub-area comprises a corresponding second target pattern of a plurality of second target patterns, wherein the plurality of first target patterns are different from the plurality of second target patterns;
    if the plurality of sub-areas comprise the plurality of second target patterns, respectively, perform a second preset image processing to the image to generate the processed image, wherein the first preset image processing is different from the second preset image processing; and
    if the plurality of sub-areas are free from comprising the plurality of second target patterns, respectively, omit the second preset image processing to the image.

14. The display control chip of claim 8, wherein the area is located in a preset position of the image.

15. A non-transitory computer readable storage media, storing a computer program for controlling a display control chip comprising a computing circuit, the computer program, when being executed by the computing circuit, causing the computing circuit to perform:
    receiving a video signal configured to transmit an image of a frame;
    with respect to a plurality of sub-areas different to each other in an area of the image, calculating a pixel number distribution of each sub-area along a plurality of characteristic values;
    determining, according to the pixel number distribution, whether the sub-area comprises a corresponding first target pattern of a plurality of first target patterns;
    if the plurality of sub-areas comprise the plurality of first target patterns, respectively, performing a first preset image processing to the image to generate a processed image;
    if the plurality of sub-areas are free from comprising the plurality of first target patterns, respectively, omitting the first preset image processing to the image; and
    generating a display signal according to the processed image or the image.

16. The non-transitory computer readable storage media of claim 15, wherein when the computing circuit determines, according to the pixel number distribution, whether the sub-area comprises the corresponding first target pattern of the plurality of first target patterns, the computing circuit compares the pixel number distribution with an ideal number distribution corresponding to the sub-area to generate a deviation value,
    wherein if the deviation value is smaller than a threshold value corresponding to the sub-area, the computing circuit determines that the sub-area comprises the corresponding first target pattern.

17. The non-transitory computer readable storage media of claim 16, wherein the threshold value corresponding to the sub-area is positively correlated with a distance between the sub-area and a center of the area.

18. The non-transitory computer readable storage media of claim 15, wherein the display control chip is configured to output the display signal to a display panel, when the computing circuit generates the display signal according to the processed image or the image, the computing circuit adjusts a resolution of the processed image or the image to a resolution corresponding to the display panel.

19. The non-transitory computer readable storage media of claim 15, wherein when the computing circuit calculates the pixel number distribution of each sub-area along the plurality of characteristic values, the computing circuit sequentially receives a plurality of pixel data of the sub-area from the video signal,
    wherein when the computing circuit receives each pixel data, the computing circuit determines a corresponding characteristic value of the plurality of characteristic values to be corresponding to the pixel data, and increases a pixel number of the corresponding characteristic value to form the pixel number distribution.

20. The non-transitory computer readable storage media of claim 15, wherein the computer program, when being executed by the computing circuit, further causing the computing circuit to perform:
    determining, according to the pixel number distribution, whether the sub-area comprises a corresponding second target pattern of a plurality of second target patterns, wherein the plurality of first target patterns are different from the plurality of second target patterns;
    if the plurality of sub-areas comprise the plurality of second target patterns, respectively, performing a second preset image processing to the image to generate the processed image, wherein the first preset image processing is different from the second preset image processing; and
    if the plurality of sub-areas are free from comprising the plurality of second target patterns, respectively, omitting the second preset image processing to the image.

* * * * *